United States Patent
Czerwonka

(12) 
(10) Patent No.: US 7,278,135 B2
(45) Date of Patent: Oct. 2, 2007

(54) METHOD AND SYSTEM FOR GENERATING AN EFFICIENT TEST SUITE FROM A DOMAIN DESCRIPTION WITH GIVEN CONSTRAINTS

(75) Inventor: Jacek A. Czerwonka, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 10/459,893

(22) Filed: Jun. 11, 2003

(65) Prior Publication Data

US 2004/0255275 A1    Dec. 16, 2004

(51) Int. Cl.
G06F 9/44 (2006.01)
(52) U.S. Cl. .................... 717/124; 717/125; 717/130; 717/131
(58) Field of Classification Search ......... 717/104–131
See application file for complete search history.

(56) References Cited

U.S. PATENT DOCUMENTS 6,321,376 B1 * 11/2001 Willis et al. ................ 717/124
6,505,342 B1 * 1/2003 Hartmann et al. .......... 717/104
6,698,012 B1 * 2/2004 Kossatchev et al. ........ 717/126
2004/0064806 A1 * 4/2004 Johnston-Watt et al. .... 717/124

\* cited by examiner

*Primary Examiner*—Meng-Al T. An
*Assistant Examiner*—Mark P. Francis
(74) *Attorney, Agent, or Firm*—Workman Nydegger

(57) ABSTRACT

Provided is a system and method comprising a test suite generation mechanism for testing a domain (e.g., software program) via "black-box" testing. Parameters are defined, appropriate values for each are chosen, and via the system and method a suite of test cases are automatically generated that covers all N-way parameter combinations (e.g., pairs when N=2) while respecting any specified domain constraints. After receiving a model comprising the parameters and respective values to test, along with constraints in a form of logical predicates, the system and method produces the test cases. Based on the constraints, an algorithm removes invalid combinations in a first stage, and prevents any other invalid combinations from being used in a second stage during the test case generation process. A full set of statistically valuable test cases are thus efficiently and automatically generated, significantly improving testing while significantly reducing the resources needed to test.

29 Claims, 11 Drawing Sheets

METHOD AND SYSTEM FOR GENERATING AN EFFICIENT TEST SUITE FROM A DOMAIN DESCRIPTION WITH GIVEN CONSTRAINTS

FIELD OF THE INVENTION

The invention relates generally to computer systems, and more particularly to testing computer programs.

BACKGROUND OF THE INVENTION

Given a large enough market, software consumers will find numerous bugs in software programs, which can reflect poorly on the developer. Thus, an important part of software development is testing to eliminate bugs in software, and to have the software designed to otherwise handle unusual circumstances. That is one reason why Beta testing is used, so that by sheer numbers, many users (who understand that bugs are likely early in the development process) can help to debug a product before it is sold to consumers.

Beta testing is only one way software is tested, and can only be done when the product under development is reasonably stable and safe enough to give to those who will use it in the real world. To get to this point, and also to find bugs that even large numbers of Beta testers may not find, software producers also run their programs through pre-arranged tests. Such pre-arranged testing is often referred to as black-box testing, in which parameters of a domain under test are varied to evaluate how the program behaves.

Black box testing can find many bugs, however there is no way for developers to realistically anticipate each of the possible combinations of parameters that can cause a bug. Testing all combinations is not practical; by way of an example to point out the difficulties in exhaustive testing, consider the "Font" dialog in the Microsoft® Word word processing program. The first "Font" tab of the "Font" dialog has lists of possible parameters for font, style, size, color, underline style, and underline color. Checkboxes are available for effects, including strikethrough, superscript, subscript, shadow, small caps, and others. On this first "Font" tab alone of the "Font" dialog, there are over 1,500,000 parameter combinations that can be tested in order to exhaustively evaluate this tab of the dialog. Moreover, there are many such dialogs and tabs. For example, there is a "Paragraph" dialog, which also has two tabs and a large number of parameters.

As can be readily appreciated, with limited computing resources and time, exhaustive testing of all such parameter combinations in a reasonable time is basically impossible for all but a few programs having very simple sets of parameters. Moreover, the ability to comprehensively test a program becomes even more impractical when each test case takes relatively long time to perform, such as when testing possible variations in installing a program, formatting a disk, and so on, where each test might take on the order of minutes to perform. As a result, even with relatively small domains, exhaustive testing is ordinarily not realistically possible.

Thus, black-box testing for all combinations, one parameter at a time, is simply not a sufficient solution to software testing. One approach is domain modeling, whereby parameters are defined and appropriate values for each of them are chosen by a tester. Then, a suite of test cases is devised out of the parameters. A simple way to test is just to cover a set of values for each parameter, without considering how the parameters combine. In general, based on the tester's own experience, the tester devises test cases that he or she believes covers the most likely interactions between parameters of the domain. As can be appreciated, while this can find some bugs, domain modeling is usually a long and tedious process, and highly dependent on the tester's ability to construct test cases. It also cannot easily be automated and often causes maintenance problems.

Another, more formal approach referred to as "default testing" makes explicit assumptions about how values will be most often combined with one another in typical usage. A tester varies one parameter per test, leaving all others with their default values, and observes how the program behaves. As can be appreciated, this type of test suite is very easy to generate, but like domain modeling is not very effective in finding bugs.

Research has shown that many bugs can be found by simply testing combinations of two parameters. This can significantly reduce the amount of resources needed to test, and thus pair-wise testing has been attempted in various ways. However, at present, such pair-wise testing, and other multiples (e.g., testing with triplets) is not a very developed technology, and is often done manually, which is time consuming and dependent on the skill of the tester. For example, not all pairs are valid, and the tester needs to recognize such constraints when testing. What is needed is an efficient way to generating an efficient test suite for testing products.

SUMMARY OF THE INVENTION

Briefly, the present invention provides a system and method that facilitates the creation of test cases covering N-way combinations of parameters (e.g., where N=2 for pairs of parameters), while respecting any specified domain constraints. By covering only N-way combinations of parameters, high-quality testing is achieved while significantly reducing the number of test variations.

Parameter combinations such as pairs of values that test parameter interaction are generated, and then those combinations are built into test cases such that all valid combinations are used in at least one test case. Because a single test case generally handles multiple combinations, a test suite comprising a reduced number of test cases (relative to exhausting testing) can be used to test all valid combinations.

Before building the test cases, constraints are applied such that any known invalid combinations of values are removed from the set of all possible combinations. Of those combinations that remain, the parameters are shuffled and a first one selected, along with a value for that parameter that is added to the test case being built, referred to as a partial test case. For other parameters, a list of valid values is obtained, with validity based on any other value for any other parameter in the partial test case being built versus any constraints. In this manner, only a valid combination of parameters is available.

Selection criteria is used to select one of the values. In one implementation, such selection criteria includes determining whether any one value would cover more uncovered combinations of parameters than any other one. If not, a first tiebreaker is applied to those values that tie for uncovering the most combinations, if used. The first tiebreaker determines whether any value appears uncovered more than any other. If not, a second tiebreaker is used, which evaluates those values which have been used and selects the value used least. If still no candidate value stands out, one of the values to which the tiebreakers have been applied is chosen as the value. The process loops back for a new parameter and value selection for that parameter, until adding a value makes a partial test case into a complete test case.

When a test case is complete and results in a new combination being covered, the test case is added to the test suite, and any uncovered combinations marked as covered. The process repeats until all valid combinations have been covered in a test case.

A constraints language is also provided to help the tester identify the constraints in the model. A constraints parser converts the test language into a syntax tree that the test case generation mechanism uses to remove any invalid combinations in a first initialization stage, and to prevent the usage of an invalid parameter within a test case during the test case generation stage.

Other advantages will become apparent from the following detailed description when taken in conjunction with the drawings, in which:

DETAILED DESCRIPTION

Exemplary Operating Environment

Figure 1:
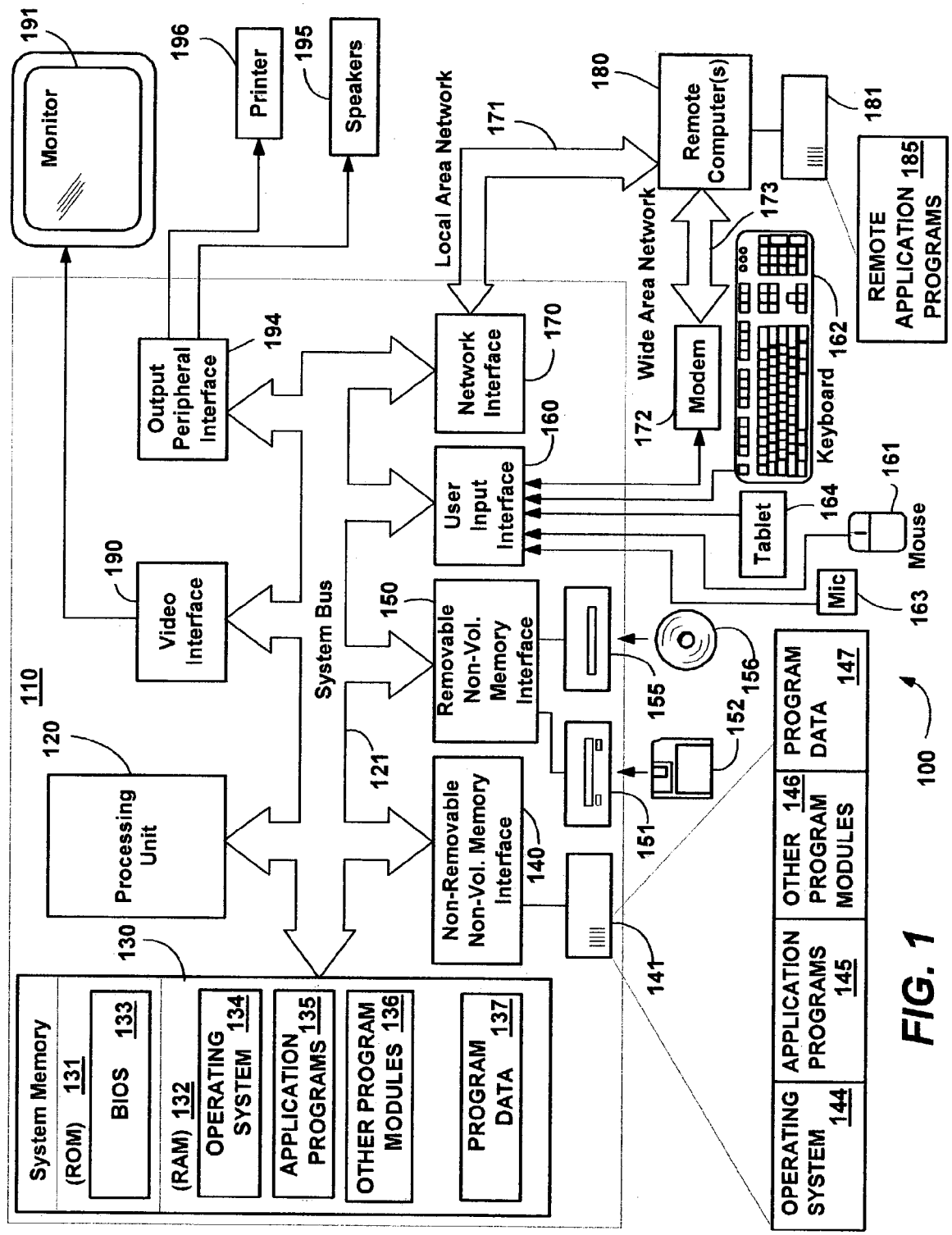
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Efficient Test Suite Generation

The present invention is, in part, directed towards a choosing an appropriate set of test cases from combinations of parameters and values, taking into consideration possible constraints on those values. Although the present invention will primarily be described with examples of pairs, it will be understood that the example mechanism described herein will work for any combinations of N parameters (N-way combinations) that can be covered, that is, N would equal 2 for pairs, 3 for triplets, and so on.

The following is a simplified example that explains how a storage volume formatting program may be tested with three parameters, with desired values for those parameters. The test suite may cover all pairs of values among the parameters, regardless of the parameters to which those values belong. For simplicity herein consider that only the parameters set forth in the following table are to be tested:

| | |
|---|---|
| Size: | 10, 1000, 5000, 40000 |
| Format: | Quick, Slow |
| FileSystem: | FAT, FAT32, NTFS |

Note that because this example is so simple, it would be reasonably possible to exhaustively test all parameter combinations, (there would be twenty-four tests required to test exhaustively), however it can be readily appreciated that more complex domains quickly become impractical to exhaustively test, because exhaustive test suites grow exponentially while combinatorial (e.g., pair-wise) test suites only grow quadratically with the number of parameters and logarithmically with the number of values in a parameter. For example, with a disk formatting program, it would be possible to test many other sizes, other file systems, and other cluster sizes. Further, other parameters, such as compressed versus non-compressed formatting, may also be tested. Thus, in an actual storage volume formatting program, exhaustive testing would not be very efficient.

The above example table results in twenty-six unique pairs:

{10, Quick}; {10, Slow}; {10, FAT}; {10, FAT32}; {10, NTFS}; {1000, Quick}; {1000, Slow}; {1000, FAT}; {1000, FAT32}; {1000, NTFS}; {5000, Quick}; {5000, Slow}; {5000, FAT}; {5000, FAT32}; {5000, NTFS}; {40000, Quick}; {40000, Slow}; {40000, FAT}; {40000, FAT32}; {40000, NTFS}; {Quick, FAT}; {Quick, FAT32}; {Quick, NTFS}; {Slow, FAT}; {Slow, FAT32}; and {Slow, NTFS}.

Note that generation of these pairs is straightforward, even in complex cases, as each value for each type of parameter is simply paired once with each other parameter of a different type, and then that value is eliminated from further pairing. For N-way combinations where N>2, generation is also straightforward. For purposes of the present example, it can be assumed that all of these pairs are valid, (however as described below with respect to handling constraints, not all of these pairs actually are valid because some file systems have size limitations).

In accordance with an aspect of the present invention, multiple combinations (pairs in this example) can be tested at the same time, in a single test, by efficiently selecting the combinations to test. For example, the table below (generated in accordance with an aspect of the present invention) shows that every pair can be tested in only twelve tests:

| Test Case | Size | Format | FileSystem |
| --- | --- | --- | --- |
| 1 | 1000 | Slow | FAT32 |
| 2 | 40000 | Quick | NTFS |
| 3 | 10 | Slow | NTFS |
| 4 | 10 | Quick | FAT32 |
| 5 | 5000 | Slow | FAT |
| 6 | 1000 | Quick | FAT |
| 7 | 5000 | Slow | NTFS |
| 3 | 40000 | Slow | FAT |
| 9 | 5000 | Quick | FAT32 |
| 10 | 40000 | Quick | FAT32 |
| 11 | 10 | Slow | FAT |
| 12 | 1000 | Quick | NTFS |

As can be readily appreciated, the reduced number of tests is possible because in this example, up to three different pairs can be tested in one test, that is, not only is "1000" and "Slow" tested in the first test case listed above, but "1000" and "FAT32" is also tested, as is "Slow" and "FAT32." In other words, each single test case covers three combinations, e.g., test case number 11 {10, slow, FAT} actually covers three pairs: (e.g., {10, slow}, {10, FAT} and {slow, FAT}. Note that some pairs (e.g., {10, Slow}) are tested more than once, however that is not typically significant, and is generally necessary so that all pairs can be tested at least once since some values for the other parameters need to be present. Further, note that even in this very simple example, there is a fifty percent reduction in the number of test cases, with only twelve test cases required, versus twenty-four test cases that would be required to test exhaustively. For larger models having more parameters, the savings is significantly larger.

Figure 2:
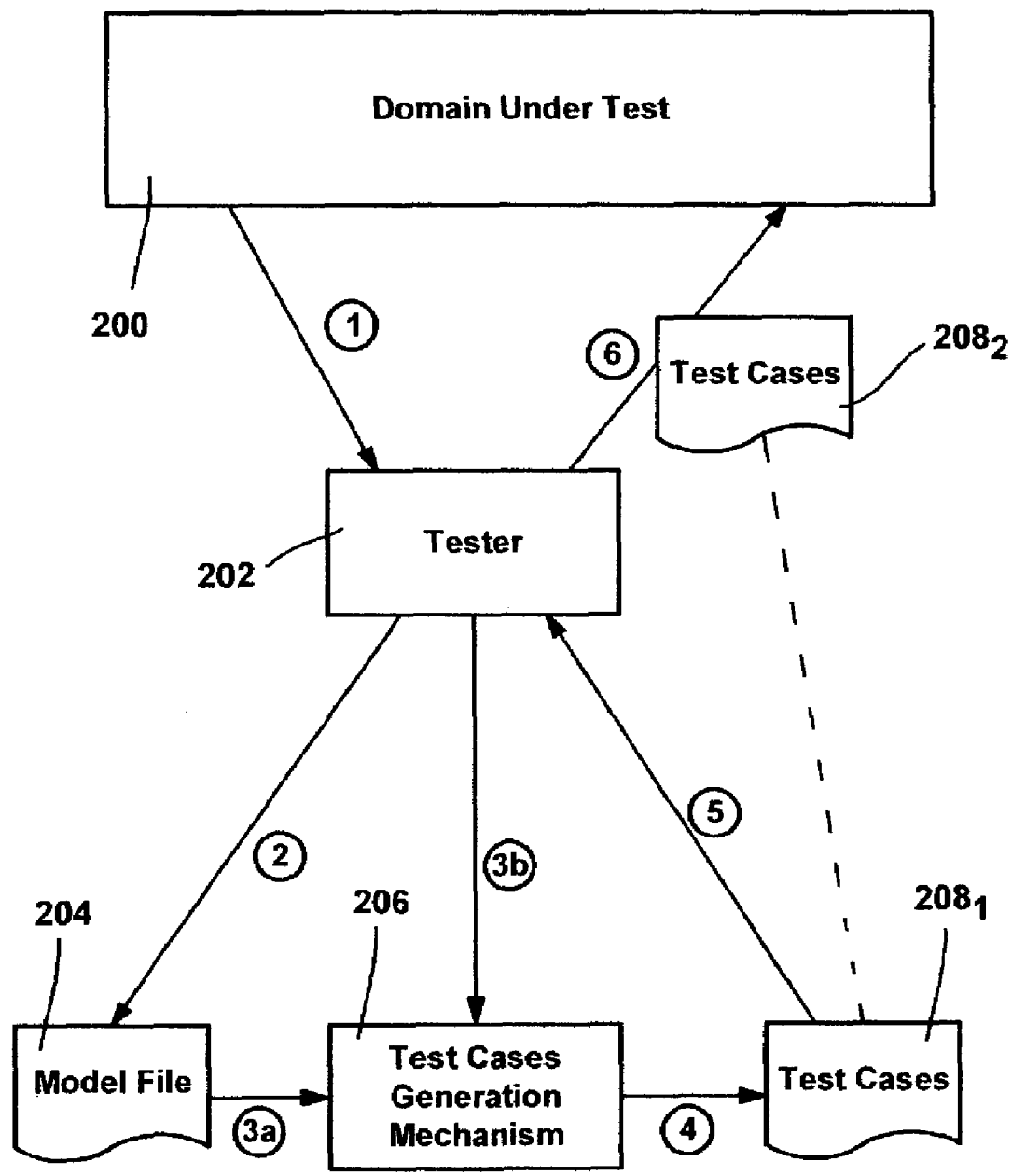
FIG. 2 is a block diagram generally representing an example test suite generation architecture used to generate an efficient test suite of test cases for testing products, in accordance with an aspect of the present invention.

FIG. 2 shows the general architecture for generating the test cases in accordance with an aspect of the present invention. The test cases, which together can be thought of as a test suite, are used for testing a domain under test 200, such as the software program for formatting a volume described above, or any appropriate domain. In general, a tester (e.g., a person or process) 202 produces a model 204 that may be maintained in one or more files and which reflects the characteristics of the domain-under-test 200. The model 204 generally includes a set of parameters and values for those parameters. For example, the tester may review the program and determine the parameters and values to test, and/or the program developer may provide a list of parameters and/or values to test along with the version of the program to be tested. The creation of the model is represented in FIG. 2 by the arrows labeled with circled numerals (1) and (2). In addition to the parameters and values for those parameters, the model may include a set of constraints that identify what parameters and/or values should not be tested. For example, a FAT storage volume cannot exceed a certain size, and thus one such constraint would specify that FAT cannot validly be paired with a size above a certain limit. Note that the set of constraints may be empty. Constraints are further described below.

As further represented in FIG. 2, the model (file) 204 is provided (represented by the arrow labeled 3a) as an input to a test case generation mechanism 206, which includes an algorithm comprising one or more processes as described below with reference to FIGS. 4-7. As represented by the arrow labeled 3b, the test case generation mechanism 206 may also receive information (e.g., from the tester 202) as to what N-way combinations should be produced, ranging from two to the total number of parameters, that is, whether pairs (N=2), triplets (N=3) and so forth should be produced for combining into tests in the test suite.

In accordance with an aspect of the present invention and as described below, with this input, the test case generation mechanism 206 outputs a set (or suite) of test cases $208_1$ (e.g., to a medium such as a storage or transmission medium). This suite of test cases $208_1$ generally has two properties, namely that all valid N-way combinations are covered at least once, and that no test case violates any of the given constraints. The arrow labeled four (4) represents these test cases $208_1$ being generated, and the dashed arrow between instances of the test cases $208_1$ and $208_2$ representing the storage and/or transmission medium. Note that an error message is produced if any problem was encountered.

Thereafter, the instance of the test suite $208_2$ is used by the tester 202 or another (e.g., manually or as an input to an automation procedure) to exercise the test cases from the suite against the domain under test 200. Note that the tester 202 may vary the tests with factors other than those in the model/test cases. For example, the tester 202 may run the test cases on a machine when memory is plentiful, and a second time when memory is scarce. Additional parameters may be varied.

Although the above approach greatly simplifies testing, in real-world scenarios, constraints need to be handled. By way of example, formatting a storage volume has an implicit limitation which says that the FAT file system cannot be applied on volumes larger than about 4 gigabytes (4000 megabytes). For that reason, any test case that covers combination of values cannot be run, (although of course a test could be separately run to make sure the formatting program properly prevents this from even being attempted). The test case generation takes this into account and for example might not allow the pair {4000, FAT} to appear in any test case, because doing so might prevent one or more other pairs from being properly tested.

Note that excluding a given invalid pair from the list of pairs to be covered, and then generating the tests cases, will not always satisfy the given constraints. For example, there are cases when a test is invalid because a certain combination of three or more parameter values makes an invalid combination, however in pair-wise testing, only pairs are known at the time before test case production starts.

Further, the problem cannot be overcome by removing all test cases which violate constraints after generation of the test suite is completed, because along with the invalid combination, one or more valid ones would be removed, which would mean that the "all valid combinations covered" requirement would be violated. For example, removing {40000, Slow and FAT} would not only remove the invalid pairing of {40000 and FAT}, but also would remove {40000 and Slow}, and {Slow and FAT}, which are valid pairs that may not be covered in another test case. As described below, the present invention assures that the properties of a comprehensive test suite (all valid combinations covered, but no invalid combinations covered) are satisfied, by providing a generation process that considers parameters and constraints throughout, as part of the overall generation process.

Figure 3:
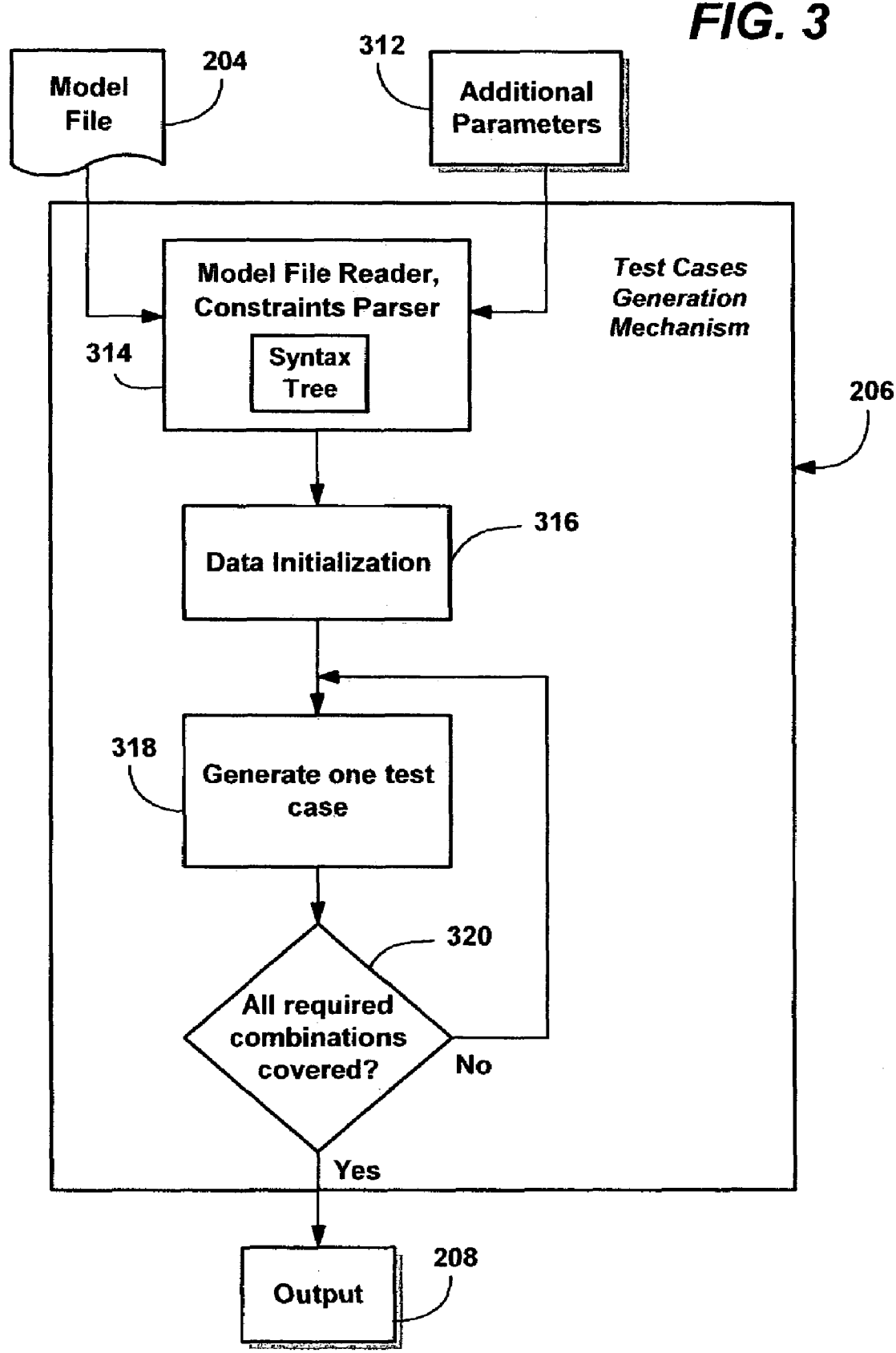
FIG. 3 is a block diagram generally representing the operation of components including those of a test cases generation mechanism that generates a test suite in accordance with an aspect of the present invention.

FIG. 3 is a representation of the general operation of the test cases generation mechanism 206. In general, the model file 204 (generally comprising the parameters and values to test and any constraints), and any additional parameters 312 (such as comprising the number N, such as N=2 for pairs) are fed to a model file reader and constraints parser component 314 of the test cases generation mechanism 206. The data is then initialized by a data initialization component 316. For example, the pairs are generated, and any invalid pairs are removed, as described below.

Components 318 and 320 represent a process within the test cases generation mechanism that generates test cases until all required combinations are covered in at least one test case. As represented by these components, the process repeats until all required combinations are covered, whereby output data in the form of test suite 208 is provided. Any invalid combinations (e.g., of three or more parameters when pairs are being tested, or four or more when triplets are being tested) can be handled in a manner that makes sure that no invalid combination is tested while a valid combination remains untested, generally by not allowing an parameter that is invalid to be used in a test case as that test case is being generated, as described below. Also, note that after generation, further processing may be done on the test suite 208, e.g., the tests in the suite may be reordered so that faster tests can be run first and the results analyzed while slower tests are running, or processed for some other reason.

Figure 4:
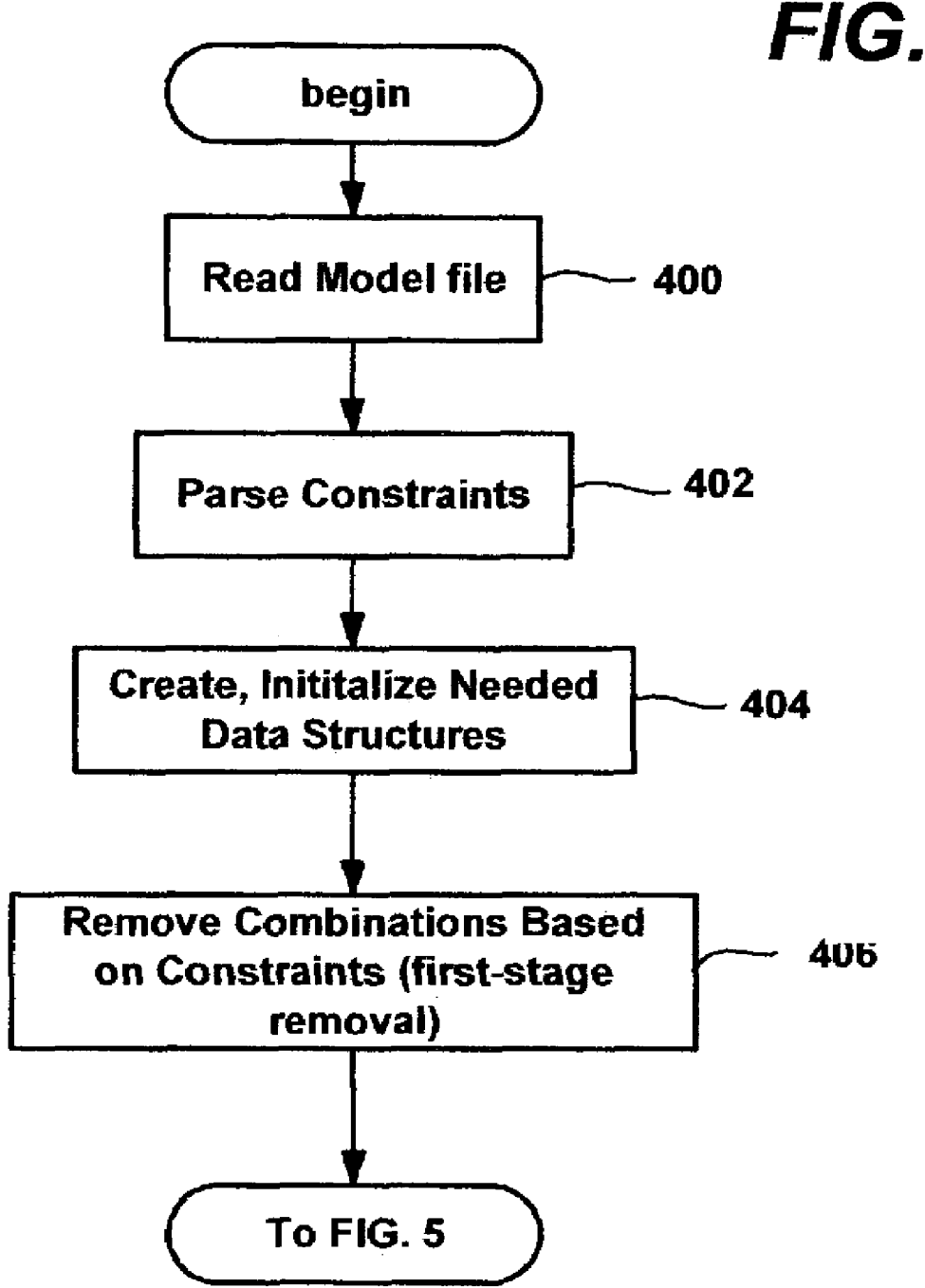
FIGS. 4-7 comprise a flow diagram generally representing processes in the test cases generation mechanism, in accordance with an aspect of the present invention.

FIG. 4 shows the processes performed by the test case generation mechanism 206 in more detail, beginning at step 400 where the model file 204, which contains parameters and their respective values, and optionally a set of constraints given as logical predicates, is read into the mechanism 206. As described above, the mechanism 206 also may be given (N) to specify the N-way combinations to be produced, although if not given, a default, such as N=2 for pair-wise generation, may be used.

Figure 7:
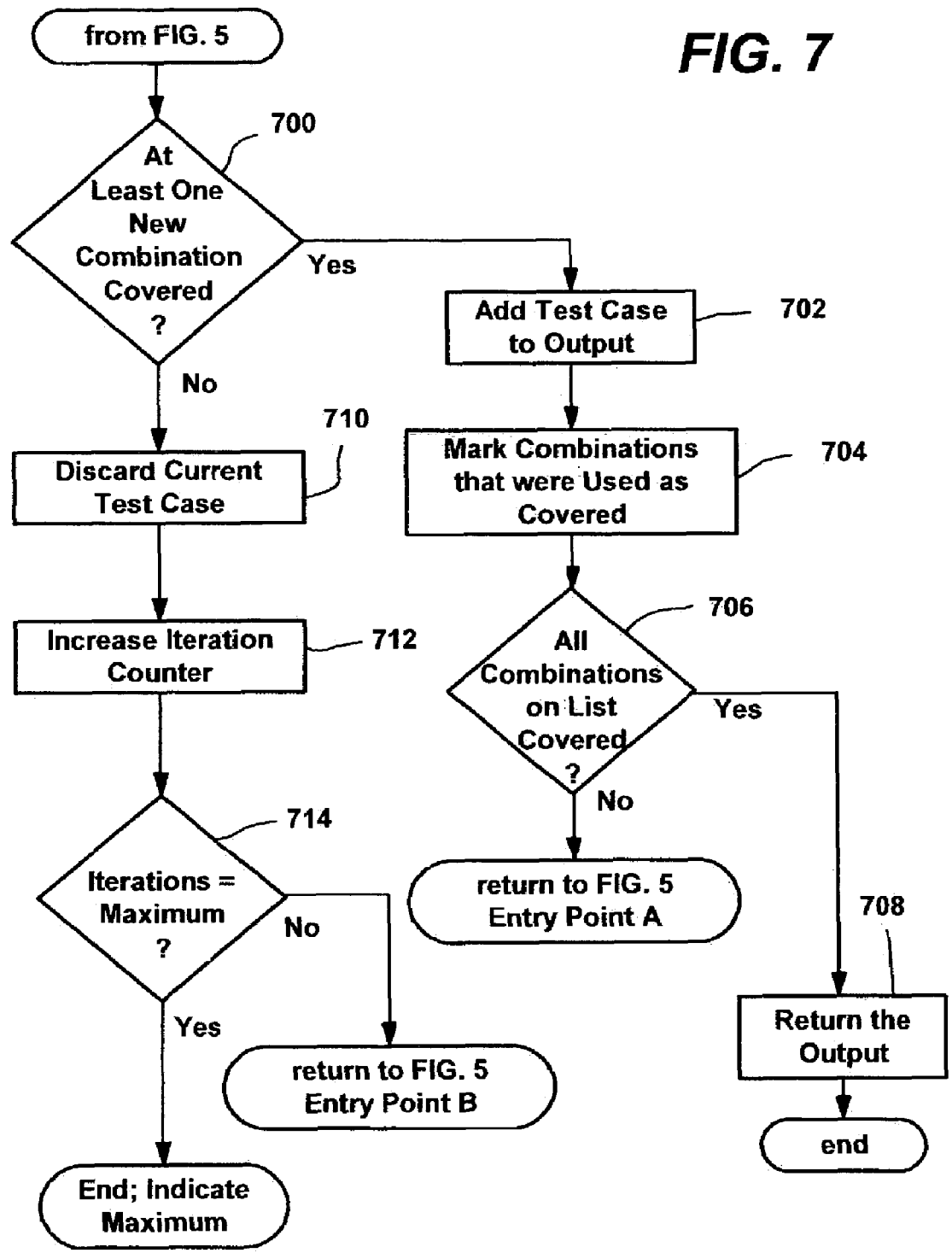
Figure 8:
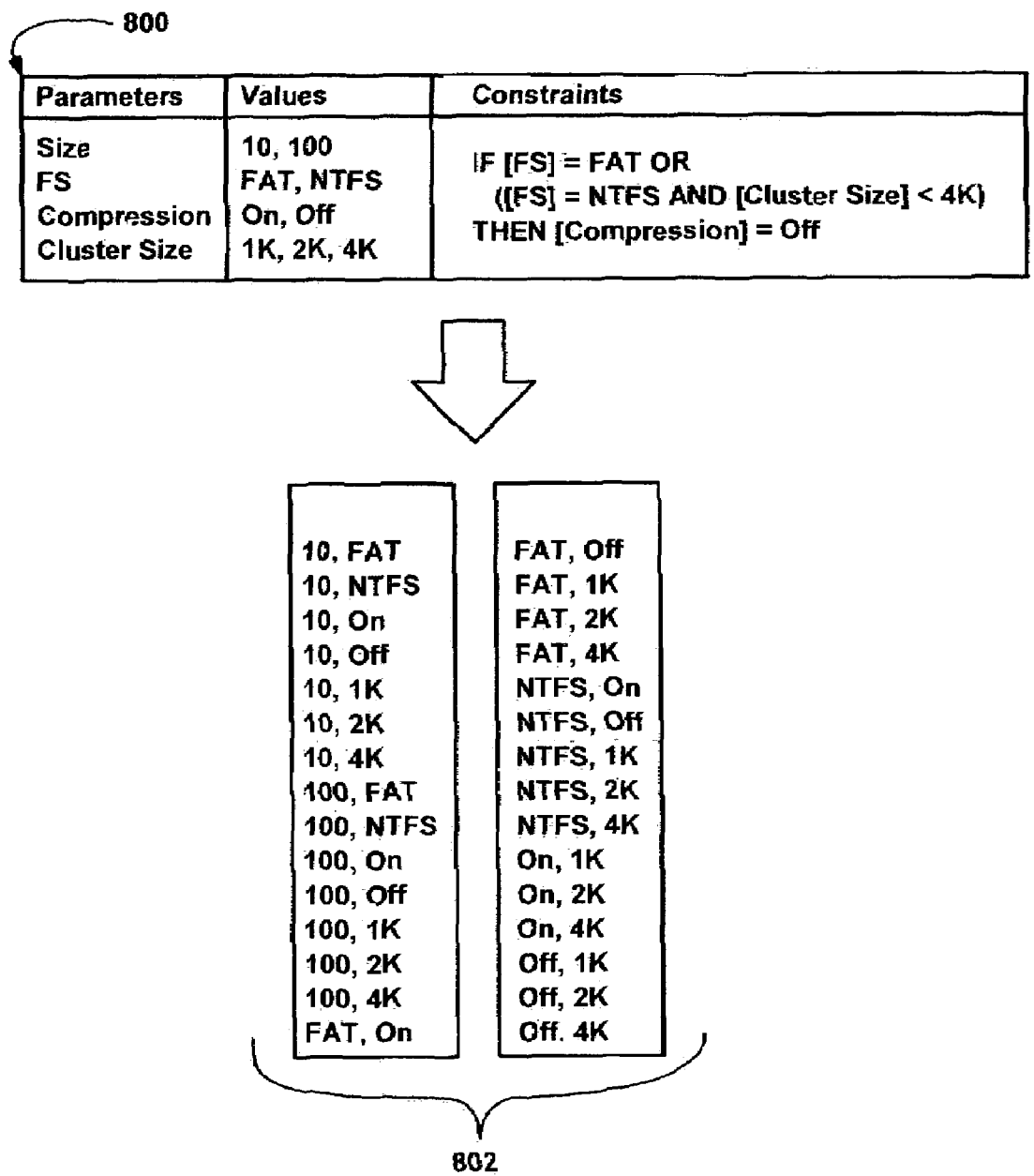
FIGS. 8-11 are example representations showing how a suite of test cases is developed when an example model file is processed by the processes of FIGS. 4-7 in accordance with an aspect of the present invention.

FIG. 8 provides an example of a model file 800 comprising parameters, values for those parameters and constraints, and the set of pairs 802 that may be generated therefrom, given a pair-wise test. Note that the general data structures of FIG. 8 are only example for purposes of readability, and that the actual structures may take virtually any feasible form. Further, note that the examples in FIGS. 8-11 will be used in conjunction with the flow diagrams of FIGS. 4-7.

Step 402 represents the parsing of any constraints, as described below. For now, the result of parsing constraints may be considered as a syntax tree that represents the constraints in a ready-to-use form. Step 404 represents the creation of the needed data structures (e.g., data arrays), including a structure that holds the combinations to be covered, e.g., (for N=2, one structure may hold the pairs, while another may hold the test cases).

At step 406, based on the constraints, any combinations that are definitely invalid and cannot be covered are removed from the list of combinations. Note that this is only a first stage of applying constraints, and another stage of applying constraints will take place during actual test case generation. This first-stage removal is based on the observation that only those constraints which involve a number of different parameters equal to N or less may be applied, whereas other constraints need to remain unprocessed until later. By way of example, when working with pairs, given a constraint such as, if [A] equals "a1" then [B] cannot equal "b1," step 406 can remove the {a1, b1} pair from the combinations to be covered, before any pairs are used to make the combinations, because the constraint applies to a pairing. However, such removal cannot be done with a constraint such as, if [A] equals "a1" AND [C] equals "c1" then [B] has to equal "b1" because such a constraint involves three parameters, and only pairs are available at this time (given this pair-wise example). Note that if instead N equaled three for triplet combinations, constraints based on combinations of two and three parameters may be applied to remove invalid combinations, but not those involving four or more parameters.

Figure 9:
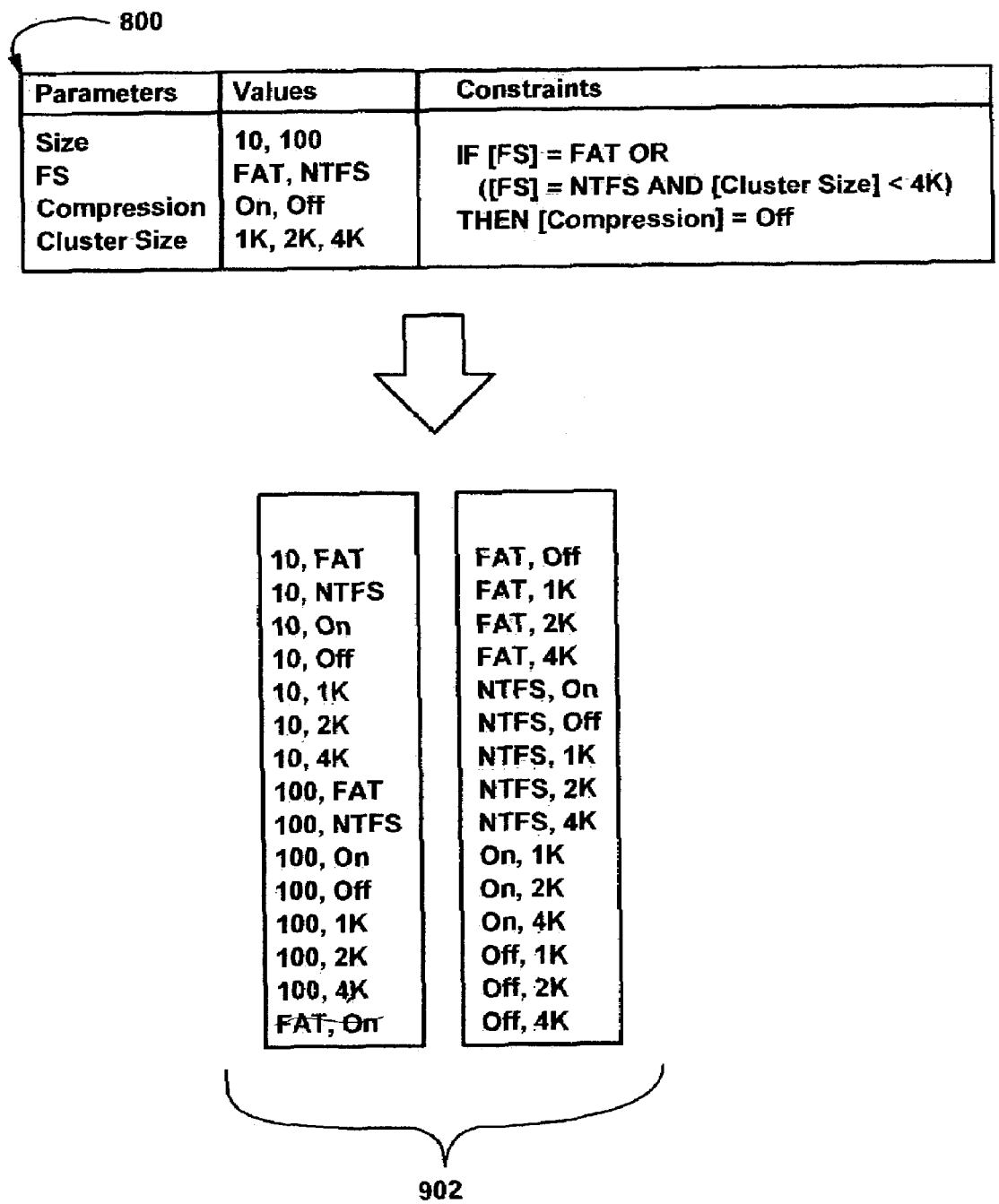

FIG. 9 provides an example of such first stage removal at step 406. In FIG. 9, the constraints in the model file 800 indicate that for this formatting program, the FAT file system cannot be used with compression, and that NTFS cannot be used with compression with a cluster size of less than 4K. Another way of stating this is that for these given values, {FAT, On}, {NTFS, 1K, ON} and {NTFS, 2K, ON} are invalid with respect to their usage in test cases. However, at this time only pairs are present, and thus only the invalid pair {FAT, On} can be removed, as represented by the crossed-out, curvy line in the modified structure 902. Note that removing this pair is not like eliminating a valid pairing once it has been used in a test case, because valid, used pairs may have to be re-used, as will become apparent below, whereas invalid pairs are never used.

As described below with reference to FIGS. 5-7, in general, following first stage removal, the main part of the test case generation process loops in an attempt to bundle as many still uncovered combinations as possible into a test case currently being built from parameter values. Any remaining constraints are also applied.

Figure 5:
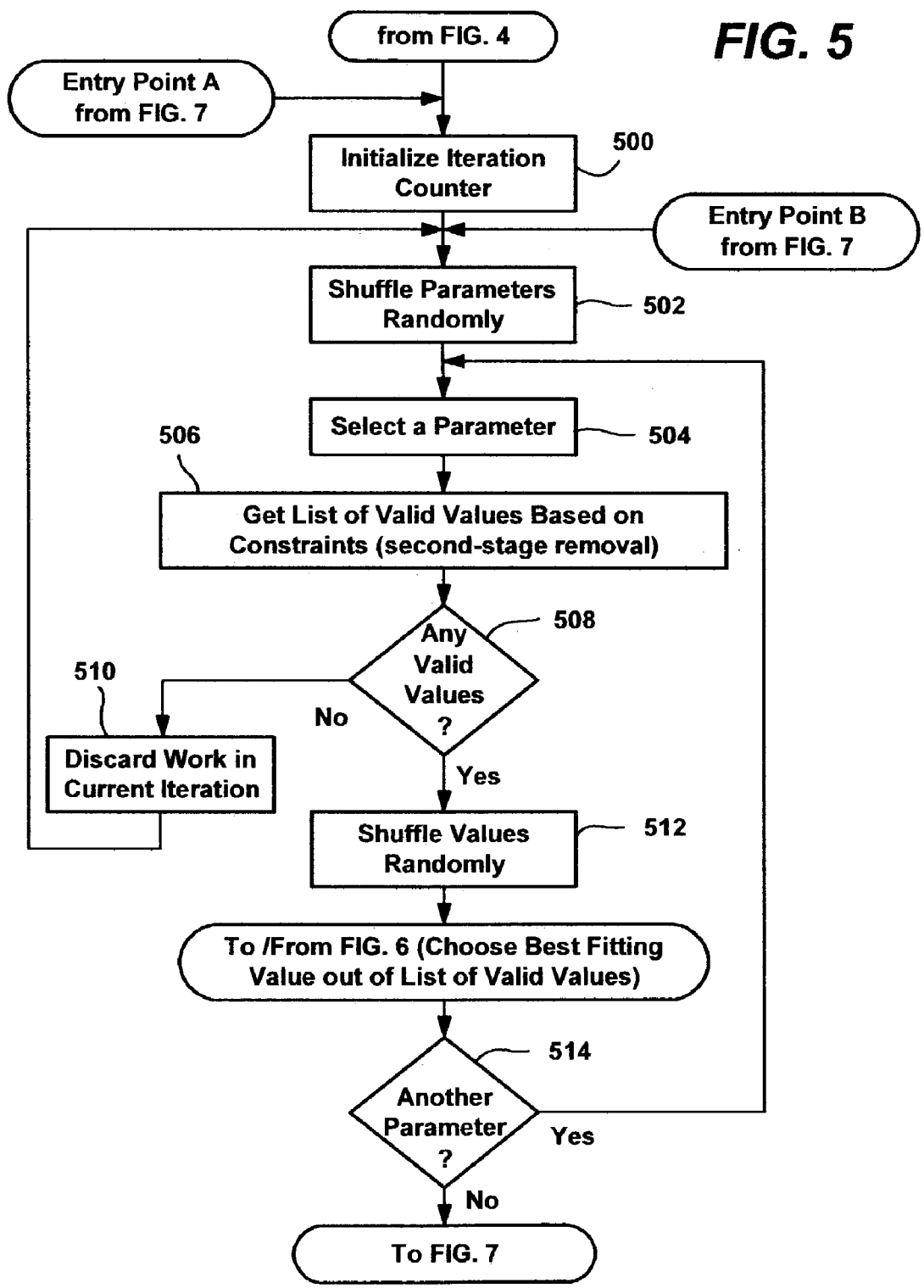

FIG. 5, step 500 essentially begins the process wherein an iteration counter is initialized, such as to zero or one. The iterations to build up test cases then begin, essentially by shuffling the parameters, e.g., randomly or pseudo-randomly, selecting one, and selecting a list of valid values for that selected parameter. These steps are represented in FIG. 5 via steps 502, 504 and 506.

It should be noted that to obtain the list at step 506, the possible values are compared with the test case being built with respect to the constraints, with any value which violates a constraint being removed from (or not added to) the list, thereby providing the second stage removal (actually prevention of using invalid values) against the actual test set values. For example, if the test set being built was {100, NTFS, On, _____}, the list of valid values would equal only 4K, and would not include 1K or 2K. Thus, in the present pair-wise example, not only are invalid pairs removed at step 406, but invalid combinations involving three or more parameters are not allowed based on the constraints.

The list of valid values also may be shuffled at step 512. Note, however, that there is no requirement that the parameters and/or values be shuffled randomly, however the parameters and/or values may need to be rearranged in some manner in the event that a particular parameter ordering prevents the test case from being generated. More particularly, if when building a test case, as a result of constraints there are no valid values for a selected parameter at step 508, the current iteration is discarded via step 510 and the parameters reshuffled so that a different test case can be assembled. Although not shown, a counter can be provided in this particular loop to exit in the event that a number of reshuffling attempts do not solve the problem.

Continuing with the example represented in FIGS. 8-11, at this time assume no test cases have been generated, and that the parameters have been shuffled into size, file system, compression and cluster size at step 502. If size is selected as the parameter at step 504, then the list of valid size values at step 506 is the set {10, 100}. As the test case being built is currently empty, these are both valid values at this time, and the process continues to step 600 of FIG. 6 to select a value from the list of valid values.

In accordance with an aspect of the present invention, a number of ranked tests are used to select a best fitting value, with a general criteria for "best" being the value, if any, that when added to a test case will eliminate or most likely eliminate the most remaining combinations, thereby tending to minimize the number of required test cases. Note that although terms such as "best," "minimize" and "maximize" are used herein, there is no intention to define such terms in an absolute sense, but rather such terms should be interpreted as (at least) approaching a desired goal, but not necessarily guaranteeing a minimum number of test cases. For example, it may be possible that given a certain set of parameters, values and constraints, an alternative process could figure out a lower number of test cases relative to the process described herein. However, the present mechanism has been found to work reliably and efficiently in practice, and provides significant gains needed to efficiently test software in real-world testing situations.

Figure 6:
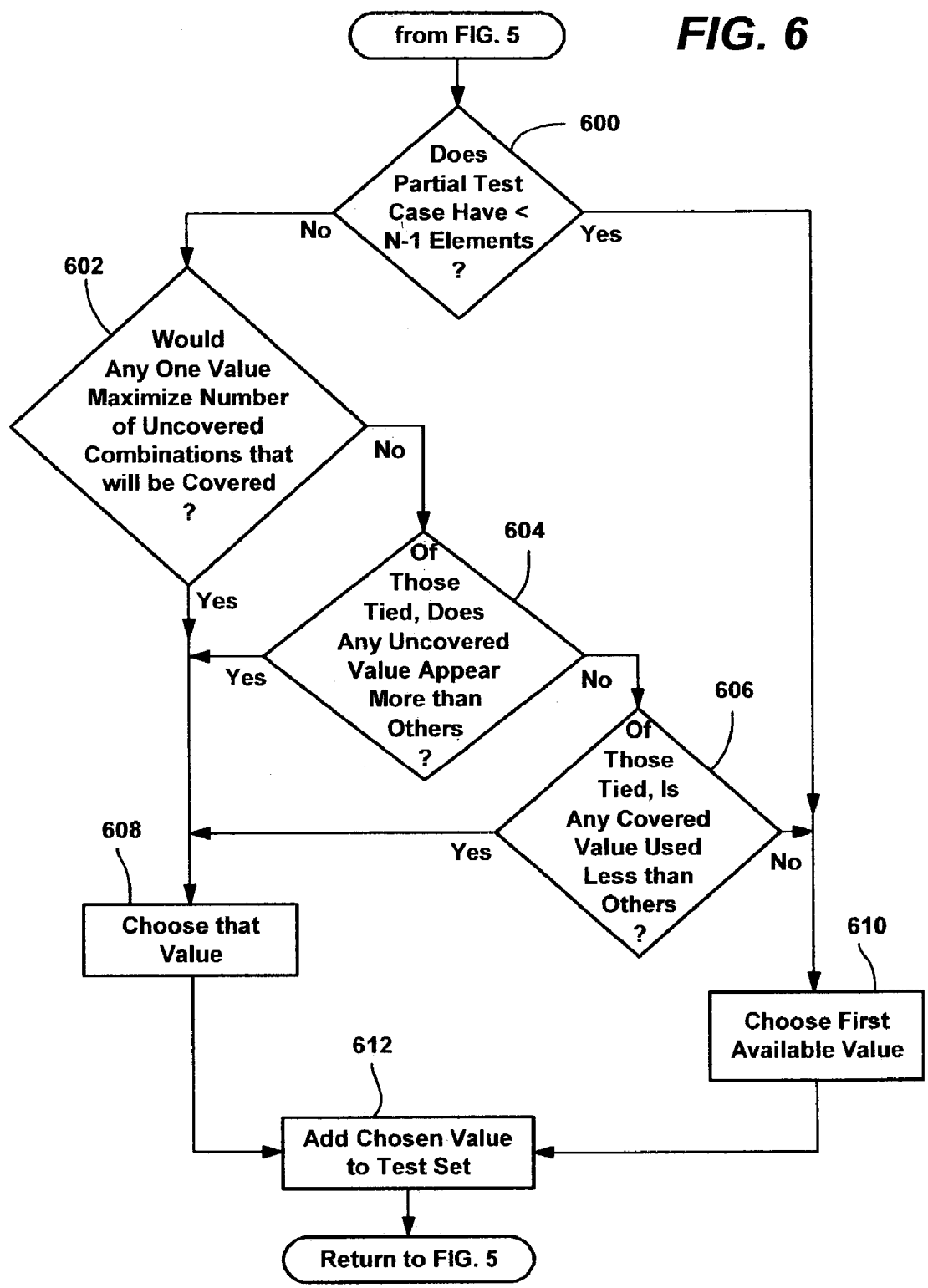

At step 600 of FIG. 6 a first test is performed to determine whether the test case being built (the partial test case) has less than N−1 elements therein. In the present example, N=2 and thus N−1=1, however the test case is empty, having zero elements. Thus, the test at step 600 is satisfied, and given the set {10, 100}, the value equal to 10 is chosen at step 610. This is added to the partial test case, e.g., {10, _____, _____, _____} as represented by step 612, which then returns to step 514 of FIG. 5. Because there is at least one other parameter to add to the test case, step 514 returns to step 504 to attempt find a value for the next parameter.

For purposes of the present example, consider the next selected parameter (step 504) as comprising the file system type, whereby step 506 will obtain the list of values {FAT, NTFS}. Note that these are both valid values with respect to the chosen size and the constraints, and since at least one exists, step 508 branches to step 512 to shuffle those values before continuing on to step 600 of FIG. 6 to select a value from the set.

This time, however, step 600 determines that because the test case has at least N−1 elements (has at least one element when pair-wise testing is active), a more intelligent selection mechanism is to be used. Step 602 represents a first way to determine an appropriate value, namely by looking for one that if chosen, would maximize the number of yet uncovered combinations which will be covered by the test case. In other words, if two values were available, for example, and choosing one would eliminate two pairs from the set 902 while choosing the other would eliminate only one pair, the one that eliminated the two pairs would be chosen at step 608. As can be readily appreciated, step 602 uses the knowledge of the past choices in an attempt to maximize the number of still-uncovered combinations, in keeping with one of the present invention's goals of efficiently building test cases. Note that once a partial test case has been generated, the effect of choosing a certain value for a current parameter is determined.

In the present example, choosing FAT or NTFS would each only eliminate {10, FAT} or {10, NTFS} from the set of pairs 902, and thus there is a tie, whereby step 602 branches to step 604. Note that any value or values that did not tie for the maximum are eliminated from contention, e.g., if two values eliminated two pairs and that was the most of any, any values that only eliminated one pair would not be evaluated in further tests, generally because eliminating pairs is an important goal.

Step 604 further tests those values that tied at step 602, by evaluating whether any value appears in the largest number of still uncovered combinations, when compared to the other potential candidate value or values. In the present example, FAT appears uncovered in six valid pairings, while NTFS is appears uncovered in seven valid pairings. Note that {FAT, On} is not considered a valid pairing. Thus, NTFS is chosen at step 608, added at step 612, and the partial test case comprises {10, NTFS, _____, _____}. As can be readily appreciated, step 604 acts as a first tie-breaker, with a general goal of maximizing the opportunity for future values to produce a test case which will cover more values. Note that it is likely better to choose a value that appears most often on the "uncovered list" because doing so improves the chances for selecting values for the next parameters that will result in covering still untouched combinations.

Step 514 loops back for the process to handle the next parameter, which is compression in this example (selected at step 504), having two possible values, On or Off, at step 506. Because the constraints allow {10, NTFS, On, _____} and {10, NTFS, Off, _____}, both of these values are valid, and step 508 branches to step 512, where On and Off are shuffled.

As described above, because the test case has at least one element and pair-wise testing is being developed, step 600 will branch to step 602. Step 602 considers how many still uncovered pairs would be eliminated (covered) if Off is chosen, and how many if On is chosen. In the Off case, {10, Off} and {NTFS, Off} would be eliminated. In the On case, {10, On} and {NTFS, On} would be eliminated. Thus, there is a tie, and step 602 branches to step 604.

Figure 10:
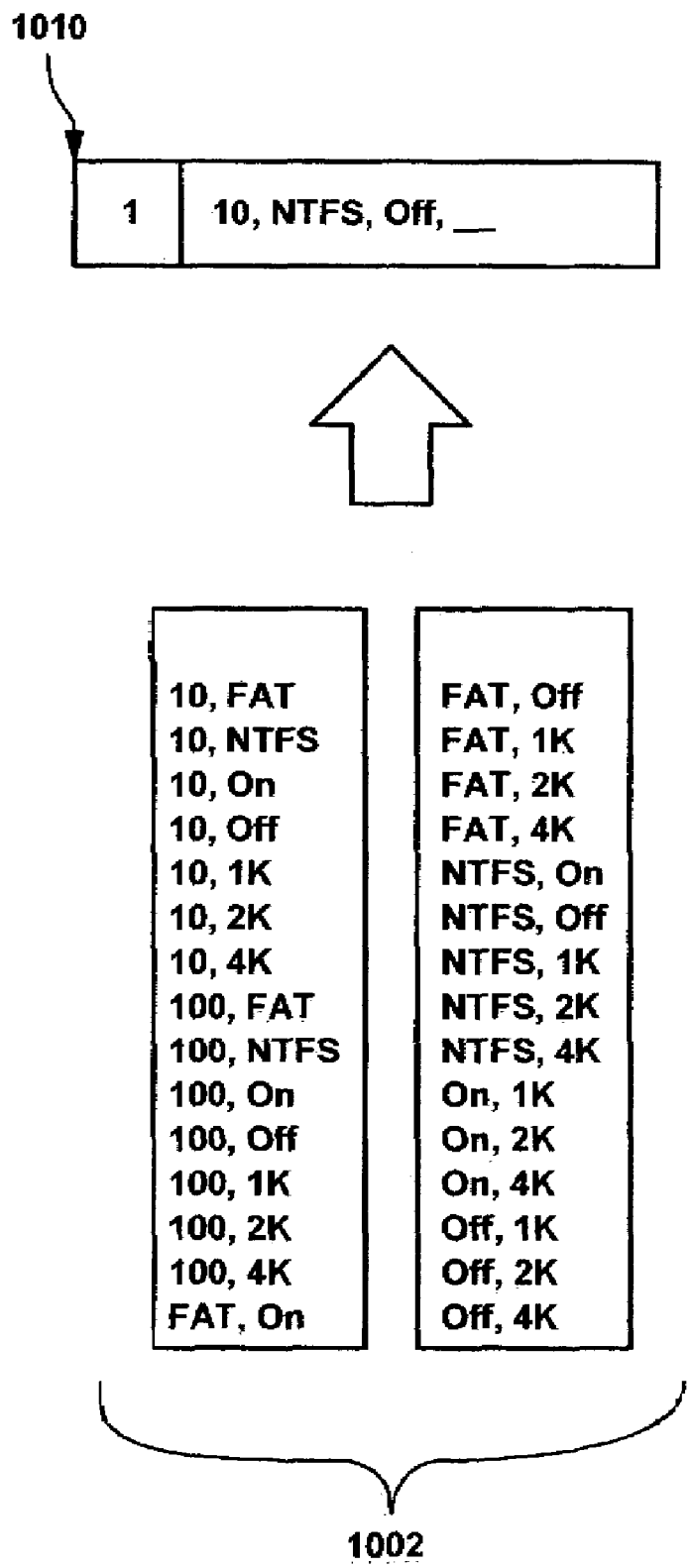

At step 604, the number of uncovered "Off" values are compared against the number of uncovered "On" values, and since Off appears in seven instances, while "On" appears in six instances, Off is chosen. The partial test case is thus {10, NTFS, Off, _____}. This state 1002 is shown in FIG. 10, with the partial test case shown via structure 1010. Note that the curved line through {FAT, On} indicates invalid and essentially removed.

As can be understood from the above description, the remaining parameter is size at step 504, with valid values comprising {1K, 2k, 4K}. Note that had compression been On, the constraints would have eliminated 1K and 2K from the list at step 506, however the shuffling and testing (FIG. 6) did not happen to work that way in the present example. As is further understood from the above description, the process continues to step 600 and on to step 602 with the values {1K, 2k, 4K}.

At step 602, the possible test cases comprise {10, NTFS, Off, 1K}, {10, NTFS, Off, 2K} and {10, NTFS, Off, 4K}. If any of these values was chosen, three currently uncovered pairs (those with 10 and the chosen size, NTFS and the chosen size and Off and the chosen size) would be eliminated, and thus there is a tie and step 602 branches to step 604. This time, the three values are equal at step 604, because each appears six times in the list of uncovered pairs 1102. Step 604 thus branches to step 606.

Step 606 looks at the covered pairs in the actual test cases (instead of the uncovered ones in the set to cover), and looks for the minimum number rather than the maximum number. At this time, no test cases are complete, and thus 1K, 2k and 4k are considered equal at step 606. Step 606 thus branches to step 610 where one of the values, e.g., 4K, is chosen (the values were randomly shuffled at step 512), and added to the test set at step 612. As can be readily appreciated, step 606 is another (second) tie-breaker, based on the knowledge that with either value from a thus far "tied" set, selection likely will do equally well in terms of certain and potential fitness. Step 606 helps spread values more equally among the test cases. For example, without having any weighing mechanism that would determine that for parameter A, a value a1 should appear twice as often as a value of a2 or a3, step 606 helps reduce the number of test cases by preventing large differences in the frequencies of occurrence for any value of any one parameter.

At this time, there are no parameters needed to complete the test case, and thus step 514 continues to FIG. 7. FIG. 7 essentially tests the progress of the process.

Figure 11:
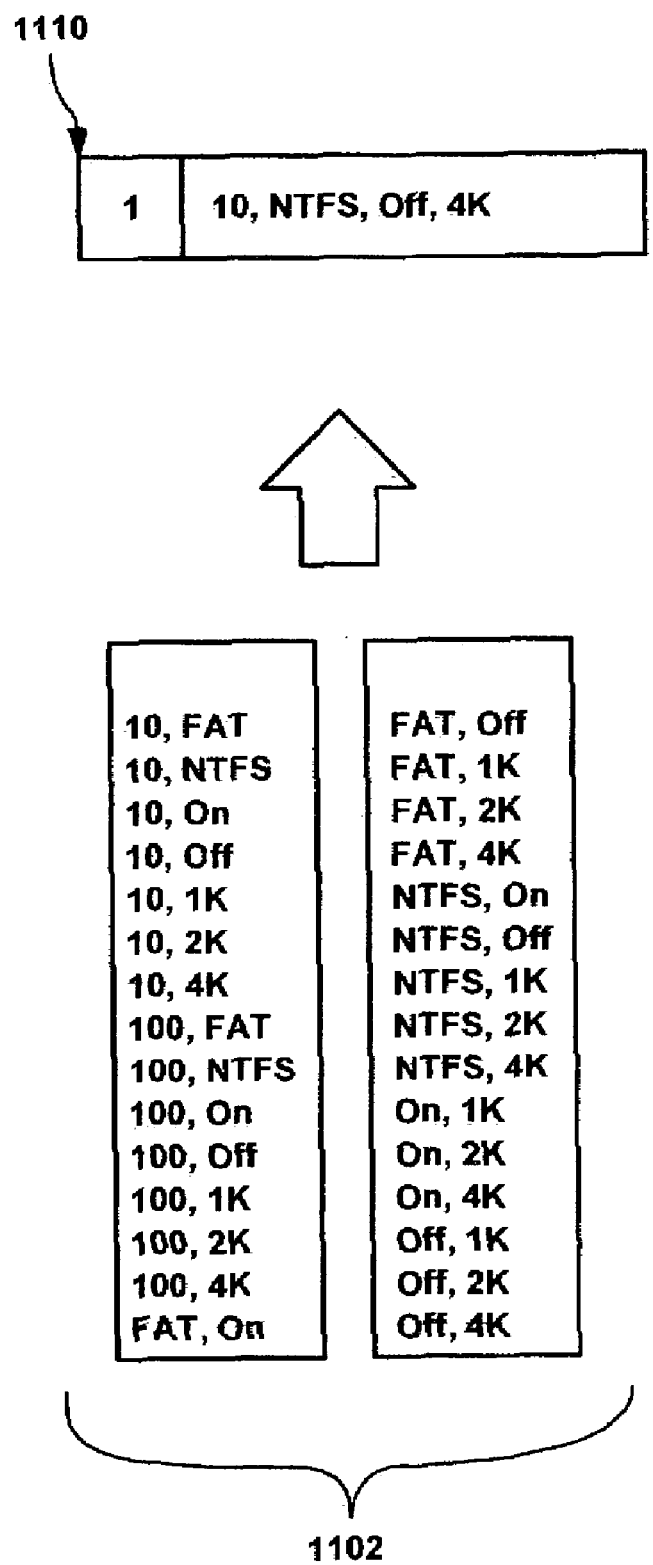

Step 700 represents testing for whether at least one new combination was covered by the most-recently built test case. If so, as in the present example, at step 702 the latest test case is added to the set that will be output when all combinations have been covered. Any combinations that were used in this test case are marked as eliminated from the list of pairs. In the present example, six pairs {10, NTFS}, {10, Off}, {10, 4k}, {NTFS, Off}, {NTFS, 4k} and {Off, 4k} are eliminated from the list of uncovered pairs, and a first test case 1110 {10, NTFS, Off, 4K} is complete, as represented in FIG. 11.

Step 706 of FIG. 7 represents a test for whether all of the valid combinations remaining on the list (e.g., the list 1102) have been covered by at least one test case. If so, the test case generation process will end, after outputting the test cases as a test suite (such as to a file), as represented by step 708. In the present example, there are other combinations, and thus the process returns to step 500 of FIG. 5 (entry point A) to build more test cases. Note that it not necessary to reset the iteration counter if the maximum number of allowed iterations is large enough to account for successful iterations.

Returning to step 700, if not at least one new combination was covered, the latest test case did not add any new pairs to be tested, and can be discarded at step 710. Note that only after the test case is built are the combinations (pairs) of that test case removed from the list (at step 704, described above). This is because if the test case is discarded at step 710, those combinations remain available during the next attempt.

The iteration counter is increased at step 712, and tested against a maximum (e.g., some fairly large number such as one-hundred) at step 714. If the maximum is reached, then there is a problem, such as an unusual combination that cannot seem to be covered given the current constraints. The process thus may end, giving the tester partial results and some indication (e.g., a list of the uncovered pairs) that an unusual situation has been encountered, perhaps allowing the tester to manually add the test case or cases needed to test any uncovered combinations, or try additional iterations. Otherwise another iteration is attempted by returning to FIG. 5, entry point B, (which does not re-initialize the iteration counter).

For brevity, because generation of the remaining test cases can be understood by simply following the operations of the test generation mechanism that have been already described herein, the present example will not be described to completion. Suffice it to state that following the rules of the operations, all valid combinations will be covered, and no constraints violated, although some of the pairs will be tested more than once.

The following is an example of a more complex model for formatting a volume, with a partial output shown therefor:

EXAMPLE OF AN INPUT FILE TO THE IMPLEMENTATION

```
TYPE, Primary, Logical, Single, Span, Stripe, Mirror, RAID-5
SIZE, 10, 100, 500, 1000, 5000, 10000, 40000
FORMAT, quick, slow
FSYSTEM, FAT, FAT32, NTFS
CLUSTER, 512, 1024, 2048, 4096, 8192, 16384, 32768, 65536
COMPRESSION, on, off
if [FSYSTEM] = "FAT"    then [SIZE] <= 4096;
if [FSYSTEM] = "FAT32" then [SIZE] <= 32000;
if [FSYSTEM] in {"FAT", "FAT32"} or
([FSYSTEM] = "NTFS" and
[CLUSTER] > 4096) then [COMPRESSION] = "off";
```

EXAMPLE OF THE OUTPUT THE IMPLEMENTATION PRODUCES

| TYPE | SIZE | FORMAT | FSYSTEM | CLUSTER | COM-PRESSION |
|---|---|---|---|---|---|
| RAID-5 | 1000 | slow | NTFS | 4096 | off |
| Single | 10 | quick | FAT32 | 1024 | off |
| Logical | 10 | slow | FAT | 32768 | off |
| Span | 5000 | quick | NTFS | 8192 | off |
| Mirror | 1000 | slow | FAT32 | 16384 | off |
| Primary | 1000 | quick | FAT | 2048 | off |
| Stripe | 10 | slow | NTFS | 65536 | off |
| RAID-5 | 10 | quick | FAT | 16384 | off |
| Primary | 5000 | slow | FAT32 | 512 | off |
| Mirror | 1000 | quick | FAT | 65536 | on |
| Stripe | 5000 | quick | FAT32 | 4096 | off |
| Single | 40000 | slow | NTFS | 2048 | on |
| Span | 1000 | quick | FAT | 512 | off |
| . | . | . | . | . | . |
| . | . | . | . | . | . |
| . | . | . | . | . | . |

As shown in the above examples, and in accordance with another aspect of the present invention, there is provided a constraint language, which in general defines constraints by a set of logical predicates. The general syntax of the predicates was chosen such that they are intuitive for developers and testers to understand and use, and so that any limitations of the domain can be specified, that is, the various possible dependencies between parameters can be expressed in this language.

In general, predicates are arranged as IF <condition> THEN <final_term> statements, stating what values are chosen (final_term) when a specific condition is met. A condition is generally a sentence comprising simple logical terms, joined by operators OR and AND. Parentheses are allowed to change the default priority of operations (which is AND before OR), and logical terms determine what values are allowed for specific parameter. The following table represents the predicate syntax:

```
Constraints      ::=
    Constraint
  | Constraint Constraints
Constraint       ::=
    IF Condition THEN Term;
  | ParameterName Relation ParameterName;
Condition        ::=
    Clause
  | Clause LogicalOperator Condition
Clause           ::=
    Term
  | ( Condition )
  | NOT Condition
Term             ::=
    ParameterName Relation Value
  | ParameterName LIKE PatternString
  | ParameterName IN { ValueSet }
ValueSet         ::=
    Value
  | Value, ValueSet
LogicalOperator  ::= AND | OR
Relation         ::=
    =
  | <>
  | >
  | >=
  | <
  | <=
ParameterName    ::= [String]
Value            ::= "String" | Number
String           ::= whatever is typically regarded as a string of
                     characters
Number           ::= whatever is typically regarded as a number
PatternString    ::= string with embedded special characters
                     (wildcards):
                        * a series of characters of any length (can be zero)
                        ? any one characters
                        # any one digit
```

The following is a predicate example:

1. IF [p1]=1 AND [p2]="a" THEN [p3]="X";

2. IF ([p1]=1 OR [p1]=2) AND NOT [p2]="a" THEN [p3]="X";

3. IF NOT ([p1] IN {1, 2}) AND ([p2] LIKE "a*" OR [p2] in {"b", "c"}) THEN [p3]="X";

4. [p1]<>[p2];

One general operation of the constraints algorithm comprises syntax parsing, which takes as input the constraints as text, and outputs a list of syntax tokens. In other words, when parsing, a syntax parser goes through the text and recognizes tokens. Semantics parsing takes as input a list of tokens, and outputs a syntax tree. Type checking is performed, as well as prioritization of logical operators.

In one implementation, tokens may be ordered using Reverse Polish Notation to eliminate the parentheses and arrange the suitable operator prioritization. The syntax tree is the built made by walking through the tokens in the Reverse Polish Notation form.

Semantic checking for each term checks that values are of the same type, that is, the value types are the same as the parameter type. Note that there are auxiliary operators comprising NOT_LIKE and NOT_IN used internally, and are not used in user-defined predicates. To type check, LIKE is only for string type and only for comparison with value, while IN is only for value sets.

NOTs are removed from the syntax tree to facilitate the next step, combinations creation. To this end, the syntax tree is walked through, moving down and removing NOTs using de Morgan laws. In the following, in which A and B are branches of a syntax tree, the rules symbolically show for AND and OR (two branches as they have two operands) and NOT (one branch), how NOTs are moved to the bottom of the tree where they can be eliminated:

1. NOT (A AND B)==NOT A OR NOT B.
2. NOT (A OR B)==NOT A AND NOT B.

Additionally:

3. NOT (A)==NOT A.

What remains are NOTs just before the term (e.g., NOT [p1]=1), which are removed by changing term's operation according to following table, where NOT A==B:

| A | B |
|---|---|
| parameter = value | parameter <> value |
| parameter <> value | parameter = value |
| parameter > value | parameter <= value |
| parameter >= value | parameter < value |
| parameter < value | parameter >= value |
| parameter <= value | parameter > value |
| parameter LIKE value | parameter NOT_LIKE value |
| parameter IN {value_list} | parameter NOT_IN {value_list} |

The next step, combinations creation, takes the syntax tree without NOTs, and outputs a list of combinations to be excluded. To this end, each term has a final set of matching values assigned. The syntax tree is walked from the bottom up, determining what values terms satisfy, and summing them to an output list (for OR operation) or performing a cross product on them with existing items on the list (for AND operation). The result is an output list based on the constraints set forth in the above examples.

To this end, both OR and AND have two operands (branches of a syntax tree), and because the tree is evaluated from the bottom up, before OR or AND are evaluated the results of both branches are already known. For example, if the left branch has $N_L$ elements and the right one has NR, the result of OR is a sum of those results, that is, they are simply put into one collection and returned. The result of an OR has $N_L + N_R$ elements. The result of AND is a cross-product of results coming from both branches, in which each element of the left branch is combined with each element of the right branch (or vice versa). The resulting set has $N_L \times N_R$ elements.

As can be seen from the foregoing detailed description, there is provided a method and system for efficiently generating a test suite for combinations of parameter values. The method and system allow automatic test case generation of statistically valuable test cases from a domain description (model), taking into account constraint limitations of the domain. The generated suite has a relatively small number of test cases, providing significant productivity gains. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
receiving a plurality of parameters, and for each parameter, a value set of at least one value to test in conjunction with at least one other parameter value in an N-way combination wherein N is at least two; and
processing the plurality of parameters and the value set for each parameter into a suite of test cases, each test case comprising one value for each parameter, the suite automatically generated such that any valid N-way combination of values appears at least once in a test case, wherein processing the plurality of parameters and the value set for each parameter into a suite of test cases comprises selecting a parameter, determining each valid value for that parameter with respect to any other value in a partial test case, and selecting a valid value as a selected value for that test case, and wherein selecting a valid value comprises determining whether any value appears uncovered more than any other.

2. The method of claim 1 wherein the N-way combination comprises a pair.

3. The method of claim 1 wherein the N-way combination is identified via a value received from an external source.

4. The method of claim 1 further comprising receiving at least one constraint, and wherein processing the parameters and the value set for each parameter into a suite of test cases comprises handling each constraint such that no test case comprises an invalid combination of parameter values.

5. The method of claim 1 wherein processing the parameters and the value set for each parameter into a suite of test cases comprises building a test case one value at a time.

6. The method of claim 5 wherein building a test case one value at a time comprises selecting a parameter, determining each valid value for that parameter with respect to any other value in a partial test case, and selecting a valid value as a selected value for that test case.

7. The method of claim 6 wherein selecting a valid value comprises evaluating the value against selection criteria.

8. The method of claim 7 wherein evaluating the value against selection criteria includes determining whether any one value for that parameter would, if used, cover more uncovered combinations of parameters than any other value.

9. The method of claim 7 wherein evaluating the value against selection criteria includes determining whether any value has been used less often than another value.

10. The method of claim 1 further comprising, receiving at least one constraint, and parsing each constraint.

11. The method of claim 10 further comprising, providing a constraints language that can be parsed into a syntax tree.

12. A computer-readable storage medium having computer-executable instructions that when executed by a processor are configured to:
receive a plurality of parameters, and for each parameter, a value set of at least one value to test in conjunction with at least one other parameter value in an N-way combination wherein N is at least two; and
process the plurality of parameters and the value set for each parameter into a suite of test cases, each test case comprising one value for each parameter, the suite automatically generated such that any valid N-way combination of values appears at least once in a test case, wherein processing the plurality of parameters and the value set for each parameter into a suite of test cases comprises selecting a parameter, determining each valid value for that parameter with respect to any other value in a partial test case, and selecting a valid value as a selected value for that test case, and wherein selecting a valid value comprises determining whether any value appears uncovered more than any other.

13. In a computing environment, a method of constructing a suite of test cases, comprising:
selecting a parameter for which a value is needed in a partial test case being built;
obtaining a list comprising at least one value for the parameter which when added to the partial test case does not violate any constraint, the values arranged as a set of N-way combinations with respect to values of other parameters;
applying selection criteria to determine a selected value from the list, wherein applying selection criteria includes determining whether any one value for that parameter would, if used, cover more uncovered N-way combinations of parameter values in the set than any other value, and if so, selecting that value as the selected value; and
adding the selected value to the partial test case.

14. The method of claim 13 further comprising, testing whether the partial test case is made into a complete test case by adding the selected value, and if so, adding the complete test case to the test suite.

15. The method of claim 14 further comprising, covering the combinations in the set that were used in the test case by marking those combinations as used in at least one test case.

16. The method of claim 13 wherein at least two values would, if used, tie for covering uncovered combinations of parameters, and further comprising, applying a tiebreaker to determine the selected value from the at least two values.

17. The method of claim 16 wherein applying the tiebreaker includes determining whether any value appears uncovered in the set more than any other.

18. The method of claim 16 wherein applying the tiebreaker includes determining whether any value has been used in less often in completed test cases than another value.

19. The method of claim 13 further comprising, receiving at least one constraint, and parsing each constraint.

20. The method of claim 19 further comprising, providing a constraints language that can be parsed into a syntax tree.

21. The method of claim 13 further comprising, arranging the values as N-way combinations with respect to values of other parameters.

22. The method of claim 21 further comprising, removing any combinations from the set when the combination can be determined as invalid with respect to a constraint.

23. The method of claim 13 wherein obtaining a list comprises, determining whether no valid value exists, and if not, discarding the partial test case, rearranging the parameters, starting a new partial test case, selecting a new parameter, and obtaining a new list comprising at least one value for the new parameter which when added to the new partial test case does not violate any constraint.

24. The method of claim 13 wherein the N-way combination comprises a pair.

25. The method of claim 13 wherein the N-way combination is identified via a value received from an external source.

26. A computer-readable storage medium having computer executable instructions that when executed by a processor are configured to:
select a parameter for which a value is needed in a partial test case being built;

obtain a list comprising at least one value for the parameter which when added to the partial test case does not violate any constraint, the values arranged as a set of N-way combinations with respect to values of other parameters;

apply selection criteria to determine a selected value from the list, wherein applying selection criteria includes determining whether any one value for that parameter would, if used, cover more uncovered N-way combinations of parameter values in the set than any other value, and if so, selecting that value as the selected value; and add the selected value to the partial test case.

27. A computer system comprising:

a processor;

one or more computer readable storage media comprising computer executable instructions that are configured to be executed by the processor, and that when executed by the processor, are configured to:

generate a plurality of parameter values, each parameter value being applicable to at least one parameter;

generate a plurality of N-way combinations where N parameters are each assigned a value from among the plurality of parameter values, and wherein generating a plurality of N-way combinations comprises generating N-way combinations for all valid combinations of parameter values assigned to parameters; and generate a test case, by selecting a plurality of N-way combinations for the test case and where a sufficient number of parameters have been assigned parameter values to create a valid test case, wherein one or more of the N-way combinations arc selected from remaining untested N-way combinations to maximize the number of valid N-way combinations, from among the plurality of N-way combinations, in the test case.

28. The method of claim 1, wherein generating N-way combinations for all valid combinations of parameter values assigned to parameters comprises:

generating all possible N-way combinations for the parameter values; and removing invalid N-way combinations.

29. In a computing environment, a method of creating a test suite comprising one or more test cases, wherein each test case comprises a plurality of parameters, each parameter having a parameter value, wherein parameter values for the test cases are selected such that all valid value combinations for different parameters in an N-way combination are represented in the test suite, where N is a value greater than two, the method comprising:

generating a plurality of parameter values, each parameter value being applicable to at least one parameter;

generating a plurality of N-way combinations where N parameters are each assigned a value from among the plurality of parameter values, and wherein generating a plurality of N-way combinations comprises generating N-way combinations for all valid combinations of parameter values assigned to parameters; and generating a test case, by selecting a plurality of N-way combinations for the test case and where a sufficient number of parameters have been assigned parameter values to create a valid test case, wherein one or more of the N-way combinations are selected from remaining untested N-way combinations to maximize the number of valid N-way combinations, from among the plurality of N-way combinations, in the test case.

* * * * *